United States Patent Office 3,400,719
Patented Sept. 10, 1968

3,400,719
PLASTIC GRAFT MATERIAL AND METHOD
OF MAKING SAME
Albert O. L. J. Eckhart Buddecke, Frondsbergstrasse 27,
Tubingen, Germany
No Drawing. Filed June 9, 1964, Ser. No. 373,835
Claims priority, application Germany, June 10, 1963,
B 72,245
7 Claims. (Cl. 128—334)

ABSTRACT OF THE DISCLOSURE

To produce improved prostheses out of woven or knitted plastic fibers or out of porous plastic materials, such materials are coated and impregnated with a weakly acid solution, which contains 0.1–5.0 percent by weight of purified procollagen in dissolved condition, whereby the solution penetrates the pores of the plastic material. By drying under mild conditions and removal of the acid components of the coating material, the dissolved procollagen is converted into a water-insoluble fibrous state, whereby an easily absorbable coating which is impervious to blood is obtained.

---

This invention relates to improvements in the production of plastic graft materials by impregnating porous plastic materials with a novel impregnating agent for the production of an improved product comprising a synthetic vascular graft material.

Grafts of plastic material are used to substitute diseased or malfunctioning arteries and these grafts are inserted in the course of a surgical operation. The plastic prostheses grafted in man or in experimental animals must be completely or so substantially impermeable to body fluids that a penetration of blood or other body fluids after implantation does not occur at all or only to a very limited extent. The lack of porosity of these plastic grafts, however, prevents their incorporation in the host organism as a result of in-growing, so that the satisfactory functioning of the plastic graft is not secured.

Grafts with a higher degree of porosity which improve the functional result must be sealed on account of the acute danger of loss of blood or other fluid by impregnating them with a suitable material. The sealing material to be used must be compatible with the host organism, have mechanical strength, be primarily insoluble in blood and other body fluids while it must be absorbed by the host organism within a certain period of time and substituted by a newly synthesized tissue.

Processes for the impregnation of porous plastic arteries are already known, but the impregnating material used does not adequately meet the aforementioned requirements. Thus, one process uses ordinary water-soluble gelatine which is applied to the plastic graft in a heated solution by dipping, after which it is dried and denatured and thus insolubilized after heating (to 140° C.) for four hours. In another process, water-soluble gelatine is converted to a chemical compound containing thiol groups by means of a reaction, after which the thiol groups are linked to disulfide bonds and the gelatine thus transformed into a water-insoluble form. The use of collagen—an animal protein—as an impregnating material has already been described. In that process, either ordinary, insoluble collagen derived from animals or a collagen, the native properties of which have been substantially modified as a result of tanning with various chemicals, is used.

All materials and processes used hitherto exhibit defects which e.g. also have a detrimental effect when the impregnated plastic arteries are grafted in the host organism. Thus, the gelatine is changed in such a way by heat denaturation or by its chemical linkage with a sulphur-containing extraneous compound that serious consequences occur in the host body. The use of ordinary collagen has the drawback that it cannot be obtained with the sufficient degree of purity required for the impregnation process on account of its complete insolubility and that it causes uncontrolled inflammations or other noxious reactions in the host organism after grafting. Additional treatment with tanning chemicals which are chemically bonded with the collagen convert the latter into a denatured protein, which is only slowly metabolized in a pathological manner and the existence of which prevents the desired formation of new tissue.

A further disadvantage of the previously known impregnated plastic grafts is the lack of elasticity of the impregnating material. The rigidity of the impregnating material involves the risk of delamination when subjected to mechanical stress or the risk of deformation; for this reason, soaking in aqueous solutions has been found to be necessary to achieve adequate flexibility. To prevent this, the addition of plasticizers of the conventional type such as e.g. mannitol inevitably leads to the incorporation of additional extraneous substances in the host organism.

The primary object of the present invention is to provide an improved process and impregnating agent for overcoming and avoiding the difficulties and detrimental side effects referred to above. A further object is to provide an improved plastic graft material.

In accordance with the invention, it has been discovered that the foregoing objects may be achieved by employing procollagen as the material for impregnating porous plastics suitable for producing synthetic grafts.

Procollagen, used as the impregnating material, is a constituent of a great many human and animal tissues, int. al. of the corium of the skin and of the arteries and it thus constitutes a physiological substitute material. Procollagen is a protein which can be extracted in soluble form from the fresh tissue by buffers containing organic acids with a pH of 3.5 and an ionic strength of 0.2 and which is converted into a quasi crystalline fibrous water-insoluble form by neutralization of the solution or removal of the acids. This process is reversible. The molecular weight of the dissolved procollagen amounts to 360,000, the rod-like molecules exhibit a length of 2,800 A. and a diameter of 15 A. The chemical composition is known. Differences in the composition of procollagen are not observed among mammals.

To carry out the process, a slightly acid aqueous solution in a concentration containing purified procollagen of 0.1–5.0, preferably between 1.0 and 1.5 percent by weight, the pH-value of which is adjusted by means of a buffer or a weak acid (as e.g. citrate buffer or acetic acid) is made and if need be a physiologically compatible plasticizer, e.g. glycerol, is added to this solution, depending on whether a volatile or non-volatile substance has been used for solubilizing the procollagen. If the solution is not immediately used for impregnation, a small amount of a preservation agent to prevent bacterial growth may be added. This agent should not cause protein denaturation and should evaporate when drying. For this purpose, e.g. thymol is suitable.

The highly viscous solution is applied to the graft plastic in such a manner that the inner and outer surfaces of a plastic tube, for example, are covered by a liquid film communicating through the pores of the tube. Drying is carried out under conditions which guarantee a uniform dispersion of the impregnating film. In the course of doing so, a maximum temperature of 30–40° C. should not be exceeded, as the thermal conversion of the procollagen into the fibrous form which is effected in this temperature range is otherwise accompanied by denaturation. The process of application and drying can be effected once or several times depending on the concentration of the dissolved procollagen or on the desired degree of impregnation.

The acid added to the impregnating solution must be removed in order to convert the procollagen from the dissolved into the insoluble form. An orientated aggregation of the molecules distributed at random in the solution into a water-insoluble macromolecular fibrous aggregate occurs in this process—analogous to the process in the living tissue.

When using volatile acid substances, the acid content is reduced during drying of the impregnating solution as evaporation increases, while the procollagen which is maintained in solution by the acid is simultaneously converted into the insoluble fibrous form. The plasticizer which has been added to the solution previous to application and which is physiologically compatible with the host remains uniformly distributed in the impregnating material, thus keeping it flexible.

When non-volatile acids are used (such as e.g. citric acid), they must be removed from the impregnating material after drying in order to transform the procollagen into its insoluble fibrous form. This is effected by inserting the plastic unit coated with impregnating material into a neutral aqueous buffer solution (e.g. 0.005–0.1 M $Na_2HPO_4$). A slight amount of an anionic polysaccharide (such as e.g. potassium-chondroitin 4-sulphate or the potassium salt of polymannuronic acid) or other substances promoting the fiber formation (such as e.g. ethanol or sodium chloride) may be added to the aqueous solution in order to avoid swelling. Subsequently the salts are removed by treating (washing) with distilled water. After an aqueous solution containing the plasticizer in a suitable concentration has been allowed to take effect, drying follows.

*Example 1*

1.25 g. pure procollagen dry substance and 1.0 ml. twice distilled glycerol are dissolved in 100 ml. 0.1 N acetic acid by means of a homogenizer. The resulting, viscous, slightly turbid solution is centrifuged for 5 min. at 3000 r.p.m. to remove air bubbles and is then subsequently used to impregnate a plastic graft unit in the following manner: 5 ml. of the impregnating solution is at first uniformly applied to the inner surface of a tubular, uniformly crimped knitted. Teflon graft of 20 cm. length having an inner diameter of 10 mm. The two ends of the tubular graft unit are then each drawn 1 cm. over a plastic rod of the same diameter and so mounted in an apparatus that the graft is in a horizontal position and completely straightened. The unit is then rotated about its imaginary inner longitudinal axis at a speed of 120 r.p.m. by means of a drive system for the rods. Sufficient impregnating solution is uniformly applied with a fine brush to ensure that the graft is covered by a liquid film as it rotates. Drying proceeds at 20° C. under continuous rotation which ensures that the impregnating solution is uniformly distributed on the inner and outer surfaces. The impregnation and drying of the outer surface is still repeated four times in the same way, using a total of approximately 25 ml. of impregnating solution. After the last drying process has been completed, the graft unit is removed from the apparatus. This treatment results in a pore-free water-insoluble impregnation film which adheres firmly to the plastic graft and which seals the originally porous plastic graft with absolute impermeability. The longitudinal elasticity resulting from the crimping of the plastic tube is widely retained even after impregnation. For purposes of sterilization, the graft unit may be heated to about 110° C. for a short period without impairment of these properties.

*Example 2*

1.25 g. of pure procollagen dry substance are dissolved by means of a homogenizer in 100 ml. citrate buffer of the following composition: 1.05 g. citric acid monohydrate, 5 cc. 1 N HCl and 10 cc. 1 N NaOH are made up to 100 cc. with distilled water. 0.1 g. of thymol corresponding to a final concentration of 0.1% is added to the solution before homogenization. The impregnating solution can be conserved for several weeks if it is kept at a temperature of +4° C. The impregnating solution is applied as described in Example 1, except that the inner surface of the tube is not coated with the impregnating solution, that is to say, impregnation is only applied to the outer surface and drying is effected at 30° C. in a filtered air stream. After the impregnating solution has been applied and dried five times, the impregnated plastic graft unit is—in order to convert the procollagen into its insoluble fibrous form—inserted in a 0.01 M $Na_2HPO_4$ solution containing 5% NaCl for 48 hours at +4° C. and then transferred into distilled water and subsequently into a 10% aqueous solution of glycerol for 24 hours each to remove the salts and then to absorb the plasticizer. Drying is effected at 20° C. The resulting, coherent impregnation film has excellent adhesive properties and provides a superior coating for the graft unit which seals it hermetically and impermeably. The longitudinal elasticity of the graft unit is not appreciably affected. As in Example 1, the graft unit can be heated to about 110° C. for sterilization without impairment of the aforementioned properties.

*Example 3*

Production, repeated application and drying of the impregnating solution are effected as in Example 2. The conversion of the impregnation material into the water-insoluble fibrous form is, however, effected in a solution which contains 0.15% of the potassium salt of chondroitin 4-sulphate dissolved in an 0.01 M aqueous $Na_2HPO_4$-solution. Further treatment and properties of the graft are as in Example 2.

*Example 4*

1.5 g. solid procollagen dry substance and 1 ml. of twice distilled glycerol are homogenized in 100 ml. of 0.25 N acetic acid and used for the impregnation of a porous plastic unit in the following manner: 20 sq. cm. of a 5 mm. thick, porous plastic material are centrifuged for 15 minutes at 3000 r.p.m. in the impregnating solution, whereby the air in the pores of the plastic is completely removed and replaced by the impregnating solution. The plastic material obtained from the impregnating solution contains an equivalent quantity of impregnating solution in its pores and this solution adheres to the plastic material due to its viscosity. After it has been dried at 20° C., during which it is occasionally turned, the resulting plastic material contains the impregnating agent in uniform distribution. Compressibility and elasticity of the plactic material are substantially retained.

The present invention offers the following advantages in contrast to prior processes and products.

Physiological substances are exclusively used for impregnation. After being carefully prepared in such a way that their native properties are fully retained, they are available in a state of high purity and can be applied to the plastic unit for making the graft in a dissolved form.

When transplanted in a host organism, procollagen is characterized by its general physiological compatibility with the host organism; it is accepted by the latter without defensive reaction and absorbed within a certain period of time without irritation of the tissue or other adverse defensive reactions.

After it has been converted into its water-insoluble form, the procollagen exhibits a high degree of elasticity and excellent adhesive properties to plastic material. The elastic properties of the plastic material are substantially retained, after impregnation, thanks to the mechanical flexibility of the impregnation material.

The impregnated plastic material produced by the process is not only suitable for the substitution of arteries, but also for substitution for other ducts containing body fluids and hollow organs or body parts such as e.g. esophagus, bile duct, urinary bladder and ureter.

What I claim is:

1. A process for producing plastic prostheses for implanting in animals and humans including impregnating porous plastic materials with acid collagen material, wherein the improvement comprises applying an acid aqueous solution of substantially pure procollagen, soluble in aqueous acid solution, to a porous plastic material and effecting impregnation thereof with the aqueous acid solution of procollagen, drying the procollagen on the impregnated porous plastic material, and removing the acid from the dried impregnated plastic material, thereby converting the procollagen on the material and in the pores of the impregnated porous plastic material into a water insoluble fibrous form, whereby a prosthesis is produced which is physiologically compatible with animal and human bodies when transplanted therein.

2. The process as claimed in claim 1, in which the solution initially contains a volatilizable acid making the solution acid.

3. The process as claimed in claim 1, in which the solution initially contains a plasticizer physiologically compatible with the host prior to application to the porous plastic material.

4. The process as claimed in claim 1, in which any non-volatile acid constituents of the coated, impregnated and dried porous plastic material are removed by immersing the coated plastic material in a neutral buffered aqueous solution.

5. The process as claimed in claim 1, comprising immersing the acid-free impregnated porous plastic material in an aqueous solution of glycerol.

6. The process as claimed in claim 1, in which the impregnating solution contains from 0.1 to 5.0% by weight of procollagen and a plasticizer physiologically compatible with the host.

7. A plastic graft material for implanting in animal and humans as replacement for body parts, ducts and organs consisting essentially of an initially porous plastic material impregnated with water-insoluble procollagen and which is impervious to body fluids.

References Cited

UNITED STATES PATENTS

| | | | |
|---|---|---|---|
| 2,838,363 | 6/1958 | Veis et al. | 117—164 |
| 2,934,447 | 4/1960 | Highberger et al. | 117—164 |
| 3,136,682 | 6/1964 | Shutung | 106—155 X |
| 3,272,204 | 9/1966 | Artandi et al. | 128—334 |
| 3,276,448 | 10/1966 | Kronenthal | 117—164 |

WILLIAM D. MARTIN, *Primary Examiner.*

R. HUSACK, *Assistant Examiner.*